United States Patent
Zamir et al.

(10) Patent No.: US 12,437,812 B2
(45) Date of Patent: Oct. 7, 2025

(54) GENERATING AND USING A STATE TRANSITION MATRIX FOR DECODING DATA IN A DNA-BASED STORAGE SYSTEM

(71) Applicant: Western Digital Technologies, Inc., San Jose, CA (US)

(72) Inventors: Ran Zamir, Ramat Gan (IL); David Avraham, Even Yehuda (IL); Alexander Bazarsky, Holon (IL)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 52 days.

(21) Appl. No.: 18/523,202

(22) Filed: Nov. 29, 2023

(65) Prior Publication Data

US 2025/0174272 A1     May 29, 2025

(51) Int. Cl.
*G11C 13/02* (2006.01)
*G16B 50/30* (2019.01)
*H03M 13/37* (2006.01)

(52) U.S. Cl.
CPC .............. *G11C 13/02* (2013.01); *G16B 50/30* (2019.02); *H03M 13/37* (2013.01)

(58) Field of Classification Search
CPC ......... G11C 13/02; G16B 50/30; H03M 13/37
USPC ............................................. 365/153, 230.06
See application file for complete search history.

(56) References Cited

U.S. PATENT DOCUMENTS

| | | |
|---|---|---|
| 2003/0225750 A1 | 12/2003 | Farahat et al. |
| 2008/0102453 A1* | 5/2008 | Ghosh ................... G16B 25/00 702/20 |
| 2008/0126556 A1* | 5/2008 | Perng ...................... H04L 65/70 709/231 |
| 2014/0336950 A1 | 11/2014 | Zhang |
| 2018/0113625 A1* | 4/2018 | Sancheti ................. G06F 3/067 |
| 2018/0113632 A1* | 4/2018 | Sancheti ............. G06F 11/2048 |
| 2018/0189448 A1* | 7/2018 | Bramlett ................ G16H 10/60 |

(Continued)

OTHER PUBLICATIONS

International Search Report and Written Opinion from International Application No. PCT/US2024/040011, mailed Nov. 13, 2024, 10 pages.

(Continued)

*Primary Examiner* — Michael T Tran
(74) *Attorney, Agent, or Firm* — DENTONS Durham Jones Pinegar (57) ABSTRACT

A state transition matrix for a data storage system indicates a reliability of data that was read or decoded from a data storage channel. The state transition matrix includes a probability of reading each state of a nucleotide base in an identified storage material when that nucleotide base was initially programmed in a particular state. The state transition matrix is generated by identifying a storage material with the most copies in the data storage system. During a sequencing process, the identified storage material is decoded, corrected and compared against the storage material that was originally synthesized. This information is used to determine the probability values for the state transition matrix. The state transition matrix is provided to an error correction system of the data storage system, which uses the probability information when determining whether decoded data of other storage materials should be corrected.

20 Claims, 4 Drawing Sheets

(56) References Cited

U.S. PATENT DOCUMENTS

| | | | |
|---|---|---|---|
| 2019/0213301 A1* | 7/2019 | Hung | G16B 50/00 |
| 2020/0034458 A1* | 1/2020 | Mehta | G06F 16/2255 |
| 2020/0097189 A1* | 3/2020 | Tao | G06F 3/0619 |
| 2020/0293193 A1* | 9/2020 | Littlefield | G06F 11/1451 |
| 2020/0382143 A1 | 12/2020 | Avraham et al. | |
| 2020/0394510 A1* | 12/2020 | Peng | G06F 3/0683 |
| 2021/0238677 A1* | 8/2021 | Bartha | C12Q 1/6874 |
| 2022/0027514 A1 | 1/2022 | Liu et al. | |
| 2022/0329261 A1* | 10/2022 | Nakamura | H03M 13/1134 |

OTHER PUBLICATIONS

Ross, Michael G., et al. "Characterizing and measuring bias in sequence data." Genome Biology 2013, 14:R51: 1-20. https://doi.org/10.1186/GB-2013-14-5-r51.

* cited by examiner

| PROGRAMMED STATE/ READ STATE | A | C | T | G |
|---|---|---|---|---|
| A | 0.9 | 0.075 | 0.025 | 0 |
| C | 0.075 | 0.85 | 0.05 | 0.025 |
| T | 0.1 | 0.2 | 0.6 | 0.1 |
| G | 0 | 0.025 | 0.05 | 0.925 |

| PROGRAMMED STATE/ READ STATE | A | C | T | G |
|---|---|---|---|---|
| A | 0.925 | 0.06 | 0.015 | 0 |
| C | 0.065 | 0.855 | 0.06 | 0.02 |
| T | 0.1 | 0.15 | 0.65 | 0.1 |
| G | 0 | 0.02 | 0.05 | 0.93 |

GENERATING AND USING A STATE TRANSITION MATRIX FOR DECODING DATA IN A DNA-BASED STORAGE SYSTEM

BACKGROUND

DNA-based storage systems are emerging as a promising storage technology. DNA is a long molecule made up of four nucleotide bases—adenine (A), cytosine (C), thymine (T) and guanine (G). For storage purposes, base units (ACTG) of synthesized DNA can be used to encode information—similar to how a string of ones and zeros represent data in traditional electronic storage systems. The encoded information may then be stored, subsequently accessed and decoded.

For example, DNA-based storage systems typically store DNA data using three main processes—synthesis (or writing) in which the base units of synthesized DNA are joined together to produce a desired DNA strand; storage, in which the DNA strand is stored in a DNA-based storage medium; and sequencing (or reading), in which the DNA strand is translated to binary/digital data.

While DNA-based storage systems are more dense than traditional electronic data storage systems, DNA-based storage systems are more prone to errors. For example, during synthesis, storage and/or sequencing, various symbols in the DNA strand may be inserted or deleted. In other examples, during synthesis, storage and/or sequencing, one symbol (or multiple symbols) in the DNA strand may be substituted for another symbol. To correct these errors, DNA-based storage systems need to dedicate a significant amount of resources to error correction code (ECC) processes, which can negatively impact the performance and the reliability of the rest of the DNA-based storage system.

Accordingly, it would be beneficial to improve the performance and correction capabilities of ECC processes of a DNA-based storage system without negatively impacting the performance and reliability of the DNA-based storage system.

SUMMARY

The present disclosure describes generating a state transition matrix for a data storage system such as, for example, a DNA-based storage system. The state transition matrix is, represents and/or models a specific DNA storage channel of the storage system and indicates a reliability of the data that was read or decoded from the storage channel. In an example, the state transition matrix includes a probability of reading each state of a nucleotide base when that nucleotide base was initially programmed in a particular state. For example, if the nucleotide base "A" is programmed or otherwise included in a DNA strand or a storage material, the state transition matrix includes the probability that the nucleotide base "A" will be read as an "A", a probability that the nucleotide base "A" will be read as a "C", the probability that the nucleotide base "A" will be read as a "T" and the probability that the nucleotide base "A" will be read as a "G". The same is true for the other nucleotide bases "C", "T" and "G".

In an example, the state transition matrix is generated by identifying a DNA strand with the most copies in the data storage system. During a sequencing process, at least one of the DNA strands is decoded. When one (or more) of the DNA strands has been decoded and/or corrected, the DNA strand that was decoded is compared against the DNA strand that was corrected (or was originally written/synthesized). This information is used to generate/populate the state transition matrix.

When the state transition matrix is generated, it is provided to an error correction system of the data storage system. The error correction system uses the probability information in the state transition matrix as part of the decoding or data correction operation.

Accordingly, examples of the present disclosure describe a data storage system that includes a control system. The control system is operable to identify a storage material that has the greatest number of copies when compared with other storage materials in the storage system. At least one copy of the storage material is decoded. A state transition matrix is generated based, at least in part, on the decoded at least one copy of the storage material that has the greatest number of copies.

In another example, a method for generating a state transition matrix for a data storage system is described. The method includes identifying a storage material having a greatest number of copies in the data storage system. At least one copy of the storage material is decoded. The state transition matrix is generated based, at least in part, on the decoded at least one copy of the storage material.

The present disclosure also describes a data storage system that includes means for identifying a storage material having a greatest number of copies. The data storage system also includes means for decoding at least one copy of the storage material and means for generating a state transition matrix. In an example, the state transition matrix is based, at least in part, on the decoded at least one copy of the storage material having the greatest number of copies.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In a DNA storage channel of a DNA-based data storage device, several different types of errors can occur during the synthesis and sequencing process. One example error type is a substitution error. In a substitution error, a base that was intended to be one particular DNA nucleotide (e.g., an 'A', 'T', 'G', or 'C') is swapped for one of the other nucleotides. Since most DNA encodings use these nucleotides to represent different binary values (e.g., 'A'=00, 'T'=01, 'G'=10, 'C'=11), a substitution of one nucleotide for another, if left uncorrected, may cause some of the data to be incorrectly recreated during the decoding process.

For example, DNA symbol substitution may occur between nucleotide bases C and T, T and G, or T and A. However, substitutions between C and T are more likely when compared to substitutions between T and G and/or when compared to substitutions between T and A. Likewise, symbol substitutions may occur between C and G or C and A. However, DNA symbol substitutions between C and A are more likely when compared to DNA symbol substitutions between C and G. Additionally, DNA symbol substitutions between A and G are less likely when compared with the other DNA symbol substitutions.

The substitution of one DNA symbol for another may be based on a probability. As such, DNA symbol substitutions may be referred to as state transitions or state transition probabilities. In order to capture the probability that a particular DNA symbol will be substituted for another DNA symbol, the present disclosure describes the generation of a state transition matrix. The state transition matrix includes information regarding the probability that one DNA symbol will be substituted for another DNA symbol during a synthesis process and/or a sequencing process.

For example, if the nucleotide base "A" is programmed or otherwise included in a particular DNA strand, the state transition matrix includes the probability that the nucleotide base "A" will be read as an "A", a probability that the nucleotide base "A" will be read as a "C", the probability that the nucleotide base "A" will be read as a "T" and the probability that the nucleotide base "A" will be read as a "G".

During a DNA strand decoding process, an error correction system associated with a decoding system accesses the state transition matrix to determine a reliability of each DNA symbol that is read from the DNA strand. The reliability information is used by the decoding system as soft information. Use of soft information increases the performance and correction capability of the decoding system and/or an error correction system, especially when compared with decoding systems that only utilize hard information.

Accordingly, the present disclosure describes many technical benefits in the area of DNA storage and retrieval, including improving error detection and remediation during decoding which increases the performance and reliability of DNA-based storage systems. Additionally, generation and use of the state transition matrix reduces the amount of error correction code parity that is needed to correct errors during the decoding process. As such, the amount of data that the DNA-based storage system can store is increased.

These various benefits and examples will be described in greater detail below with reference to FIG. 1-FIG. 4.

Figure 1:
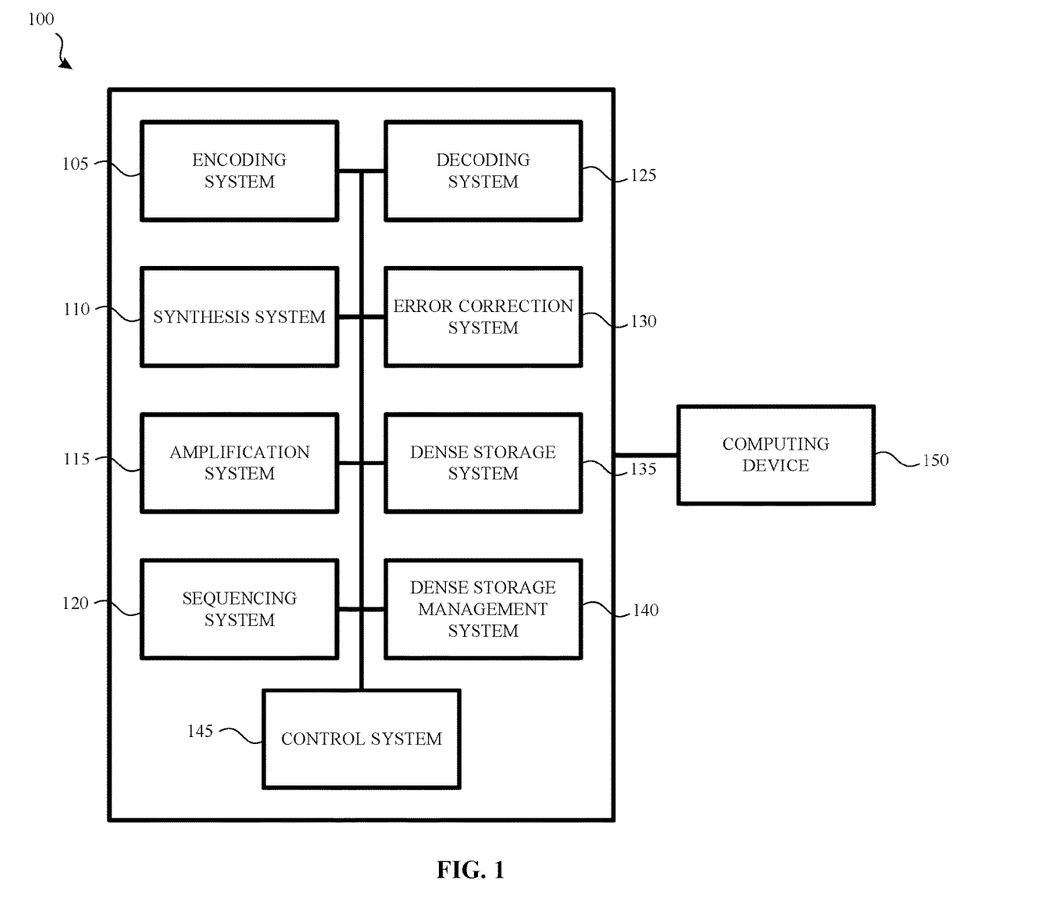
FIG. 1 illustrates a data storage system according to an example.

FIG. 1 illustrates a data storage system 100 according to an example. The data storage system 100 may be used to store data that is "more dense" when compared to data that is stored in a traditional electronic storage medium such as, for example, hard disks, optical disks, flash memory, and the like. For example, the data storage system 100 may be used to store synthetic DNA-based data.

Although synthetic DNA-based data and associated DNA-based storage systems are specifically mentioned, the systems and methods described herein may be applicable to traditional electronic storage mediums/systems and/or traditional digital/binary data.

DNA includes four naturally occurring nucleotide bases: adenine (A), cytosine (C), thymine (T) and guanine (G). In order to store data in synthetic DNA, received data is encoded to the various nucleotide bases. For example, data received as ones and zeros is encoded or otherwise mapped to various sequences of the synthetic DNA nucleotide bases. Once encoded, the data may be synthesized (e.g., written) and stored (e.g., in a dense storage system). To retrieve the stored data, the synthetic DNA molecules are sequenced (e.g., read) and subsequently decoded. As part of the decoding process, the synthetic DNA nucleotide bases are remapped to the original ones and zeros. Each of these processes will be discussed in greater detail below. Effectively, the binary system of 0's and 1's (e.g., two states of a binary "base-2" numeral system, represented in one conventional binary bit) are represented in a quaternary system of A's, C's, T's, and G's (e.g., four states of a quaternary "base-4" numeral system, represented by a single nucleotide of DNA) when the source binary (e.g., base-2) data is encoded in the quaternary (e.g., base-4) system of nucleotides.

The process of converting the input data (base-2) into DNA molecule(s) (base-4) and subsequently converting the DNA molecule(s) (base-4) into output data (base-2), including any of the interim processes that the data and/or DNA molecules undergo, may be referred to herein as "the DNA storage channel." It should be understood that, in these examples, it is an objective of the DNA storage channel and the systems and methods described herein to generate output data that is as close to identical to the input data as possible.

In an example, the data storage system 100 includes an encoding system 105. The encoding system 105 receives digital/binary information and/or data (e.g., binary ones and zeros, or "base-2") from a computing device (e.g., computing device 150) or from another source. This data may be referred to herein as "input data," "source data," or "original data." Such input is initially stored and represented in conventional base-2 binary (e.g., when not embodied in DNA). When the input data is received, the encoding system 105 converts or maps the ones and zeros of the original data into various DNA sequences using the synthetic DNA nucleotide bases A, C, T, and G.

For example, the DNA nucleotide base "A" may be assigned a value 00, the DNA nucleotide base "C" may be assigned a value 01, the DNA nucleotide base "T" may be assigned a value 10 and the DNA nucleotide base "G" may be assigned a value 11. These binary-to-quaternary mappings, and their complements, are used in the examples provided herein, but it should be understood that any similar mapping may be used.

In one example, the encoding system 105 performs a "direct encoding" process when preparing input data for memorialization in DNA. Direct encoding includes the binary-to-quaternary mappings to translate or convert each pair of bits into a single nucleotide. For example, input data of 010010110100 may be directly encoded as a DNA sequence or a DNA strand (also referred to herein as a "storage material") of CATGCA. This data, when embodied in DNA form, may be referred to herein as "DNA data." Such direct encoding of data yields one nucleotide of DNA data for every two bits of input data. Other more complex encoding processes are described herein.

The data storage system 100 may also include a synthesis system 110. In an example, the synthesis system 110 writes or otherwise manufactures DNA strands based on the data provided by the encoding system 105. For example, using a series of chemical steps or processes, the synthesis system 110 creates and assembles the various DNA bases (e.g., the ACTG bases) to mirror the base-4 representation determined from the encoding process. Although chemical steps or processes are mentioned, the synthesis system 110 may use other synthesis techniques. In an example, the synthesis system 110 includes hardware systems or components configured to create such DNA strands as well as software and/or electronic systems or components for controlling the hardware systems or components.

Continuing with the example above, during synthesis, since the digital data of 010010110100 is represented as CATGCA, the synthesis system 110 would first generate and/or identify a "C" base. An "A" base would then be generated and/or identified and be attached to the "C" base. A "T" base would then be generated and/or identified and be attached to the "CA" combination that was previously generated. This process repeats until the entire DNA strand (e.g., CATGCA) is created. The terms "created", "generated", or "synthesized", and their variants, may be used interchangeably herein when referring to the making of a real-world synthetic strand of DNA. Further, the terms "storage material", "DNA strand", "DNA string" and "DNA sequence" may also be used interchangeably to refer to the synthetic DNA molecule created during the processes described herein, or to a mathematical representation of that DNA strand, depending on context.

When the synthesis process is complete, the DNA strand is stored in a physical storage medium such as, for example, a dense storage system 135 (e.g., one or more synthetic DNA molecules). The dense storage system 135 enables the synthesized DNA strand to be stored and subsequently accessed. In an example, any storage medium capable of storing DNA-based data may be used as the dense storage system 135.

Once the DNA strand has been stored, it may be subsequently accessed and prepared for sequencing (e.g., being read). As part of the preparation process, multiple copies of the DNA strand may be generated. In an example, an amplification system 115 of the data storage system 100 may ensure that multiple copies of the DNA strand are generated.

A sequencing system 120 may then be used to read one or more of the DNA strands from the dense storage system 135. In an example, the sequencing system 120 determines and/or identifies an order of the DNA symbols (e.g., ACTG) in a DNA segment of a DNA strand that is being read. The sequencing system 120 may use a variety of sequencing methods such as, for example, sequencing by synthesis, nanopore sequencing, and the like.

Once the DNA strand has been read, a decoding system 125 maps the DNA symbols (e.g., in base-4) back to digital data (e.g., in base-2). For example, in "direct decoding," if the decoding system 125 receives CATGCA as the DNA strand, the decoding process performed by the decoding system 125 would return 010010110100 (e.g., using the corollary of the binary-to-quaternary mappings discussed above) to a requesting computing device (e.g., computing device 150). Other more complex decoding processes may be used. For example, the inverse of the encoding process used to make the DNA strand may be used as the decoding process.

In some examples, errors may occur during the synthesis process, the storage process and/or the sequencing process. These errors may be, for example, insertion and deletion ("indel") errors and/or substitution errors. For example, during a synthesis process in which the DNA strand CATGCA is being synthesized, one or more symbols may be deleted or lost during the creation of the DNA molecule. As a result, a DNA strand CTGCA may be stored by the dense storage system 135. In another example, during a synthesis process in which the DNA sequence CATGCA is being synthesized, an additional symbol may be added. As a result, a DNA strand CCATGCA may be stored by the dense storage system 135. Although a single insertion error and a single deletion error are discussed, multiple deletions and/or insertions may occur in a synthesis process. Additionally, these errors may occur during storage and/or during a sequencing process (e.g., during the writing/creating of the DNA molecule, or during the reading/sequencing of the DNA molecule).

In yet another example, during a synthesis process in which the DNA strand CATGCA is being synthesized, the synthesis system 110 may substitute one symbol for another. As a result, a DNA sequence TATGCA may be stored in the dense storage system 135 instead of the DNA sequence CATGCA. In an example, multiple substitution errors (along with one or more indel errors) may occur during the synthesis process, during storage and/or during a sequencing process.

In order to address the above, the data storage system 100 also includes an error correction system 130. The error correction system 130 may be part of the decoding system 125. The error correction system 130 may use various processes to detect and address indel errors and/or substitution errors.

For example, the error correction system 130 and/or the decoding system 125 may generate and use a state transition matrix that includes information about the reliability of each DNA symbol that is read during a sequencing and/or a decoding process. In an example, the reliability of each DNA symbol is based, at least in part, on a probability of reading each state of a nucleotide base when the nucleotide base was originally programmed in a particular state.

For example, if the nucleotide base "A" is programmed or otherwise included in a particular DNA strand, the state transition matrix includes a probability that the nucleotide base "A" will be read as an "A", a probability that the nucleotide base "A" will be read as a "C", the probability that the nucleotide base "A" will be read as a "T" and the probability that the nucleotide base "A" will be read as a "G". When determined, the probabilities are provided to the error correction system 130 which determines, based on the probabilities in the state transition matrix, whether an error correction on that particular symbol should be initiated.

In an example, the decoding system 125 generates the state transition matrix. In one example, the state transition matrix is generated by identifying a DNA strand with the highest chance of being decoded successfully. In one example, the DNA strand with the highest chance of being decoded successfully is a DNA strand with the most copies (e.g., when compared with the number of copies of other DNA strands) in the data storage system 100. For example, and as previously discussed, the amplification system 115 may generate multiple copies of one or more DNA strands stored by the data storage system 100. The amplification system 115 may generate copies during a synthesis process and/or a sequencing process.

In another example, the DNA strand with the highest chance to be decoded successfully is a DNA strand with a lowest error rate when compared with the other DNA strands stored by the data storage system 100. In an example, the decoding system 125 and/or the error correction system 130 (or another system of the data storage system 100) determines which DNA strand has the lowest error rate based, at least in part, on the error correction capability (ECC) code associated with the error correction system 130.

In yet another example, the DNA strand with the highest chance to be decoded successfully is a DNA strand with the least amount of problematic sequences. In an example, the DNA strand with the least amount of problematic sequences is a DNA strand with the fewest amount of homopolymer sequences, as homopolymer sequences can cause elevated error rates. In still yet another example, a DNA strand with the least amount of problematic sequences is a DNA strand with a high or low GC content (e.g., an amount of nucleotide base pairs G-C), as this may cause elevated error rates. In yet another example, the DNA strand that has the highest chance of being decoded successfully is identified using a combination of two or more of the criteria set forth above.

In an example, when the copies of the DNA strand are generated, the amplification system 115 (or another system of the data storage system 100) tracks the number of copies of each DNA strand that are created. In another example, each DNA strand, along with its copies, are associated with an identifier. As such, when it is time to determine which DNA strand has the most copies, the identifiers may be used to count or identify the number of copies of each DNA strand.

When the DNA strand with the most copies is identified, the decoding system 125 decodes at least one copy of the identified DNA strand. In an example, as part of the decoding process, the error correction system 130 corrects any errors that are found during the decoding process. The decoding system 125 and/or the error correction system 130 also compares the data that was originally written to the DNA strand with the decoded and/or corrected data of the identified DNA strand. This information is used to populate the state transition matrix.

For example, the decoding system 125 determines that the DNA strand initially included M "A" nucleotide bases. However, during the decoding process, the decoding system 125 determines that of the M "A" nucleotide bases, W were read as "A", X were read as "C", Y were read as "T" and Z were read as "G".

In an example, this information is used to determine a probability that the programmed state of the nucleotide base will be the same as the read state. For example, to determine the probability that the programmed state of the nucleotide base "A" will be read as an "A", the total number (e.g., W) of nucleotide bases that were decoded or read as "A" is divided by the total number (e.g., M) of the nucleotide base "A" that was initially included in the identified DNA strand. This process repeats for the nucleotide bases "C", "T" and "G".

For example, to determine the probability that the programmed state of the nucleotide base "A" will be read as a "C", the total number (e.g., X) of nucleotide bases that were decoded or read as "C" is divided by the total number (e.g., M) of the nucleotide base "A" that was initially included in the DNA strand.

This process repeats for each of the other nucleotide bases in the DNA strand. For example, the decoding system 125 also determines that the identified DNA strand initially included N "C" nucleotide bases. However, during the decoding process, the decoding system 125 determines that of the N "C" nucleotide bases, W' were read as "A", X' were read as "C", Y' were read as "T" and Z' were read as "G".

To determine the probability that the programmed state of the nucleotide base "C" will be read as a "C", the total number (e.g., X') of nucleotide bases that were decoded or read as "C" is divided by the total number (e.g., N) of the nucleotide base "C" that was initially included in the identified DNA strand. This process repeats for the nucleotide bases "A", "T" and "G".

For example, to determine the probability that the programmed state of the nucleotide base "C" will be read as a "A", the total number (e.g., W') of nucleotide bases that were decoded or read as "A" is divided by the total number (e.g., N) of the nucleotide base "C" that was initially included in the identified DNA strand. When the probability information is obtained or determined, the probabilities may be included in a state transition matrix.

Figure 2A:
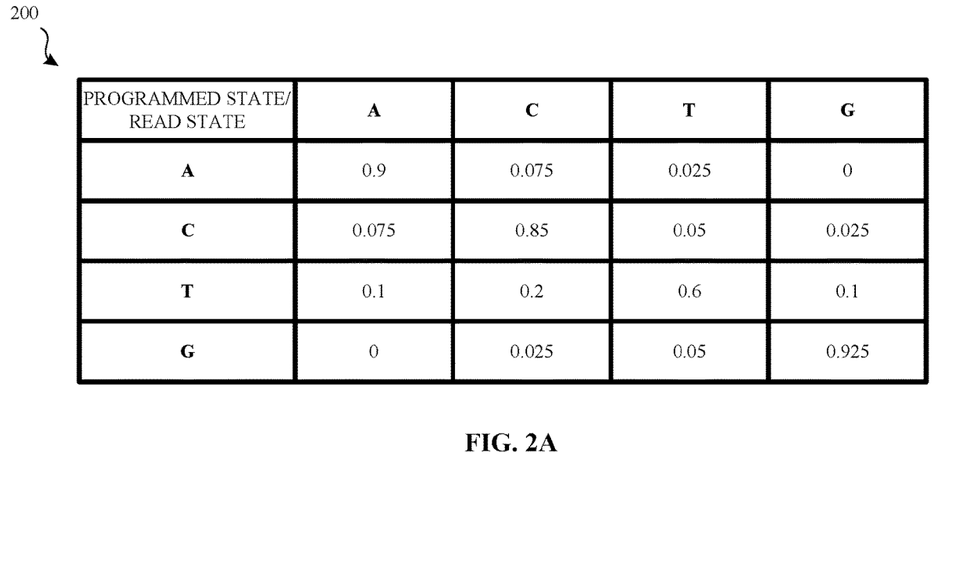
FIG. 2A illustrates a state transition matrix for a data storage system according to an example.

FIG. 2A illustrates a state transition matrix 200 for a data storage system according to an example. In an example, the state transition matrix 200 is generated by a decoding system such as, for example, the decoding system 125 shown and described with respect to FIG. 1. The state transition matrix 200 includes information regarding an initial programmed state of an identified DNA strand along with a probability that the initial programmed state of a nucleotide base will be read as each of the other states.

For example, the state transition matrix 200 shows that when the nucleotide base "A" is initially programmed in the DNA strand, there is 90% probability that "A" will be read, a 7.5% probability that "C" will be read, a 2.5% probability that "T" will be read and a 0% probability that "G" will be read. Likewise, when the nucleotide base "C" is initially programmed in the DNA strand, there is 7.5% probability that "A" will be read, an 85% probability that "C" will be read, a 5% probability that "T" will be read and a 2.5% probability that "G" will be read. The same is true for the nucleotide bases "T" and "G". Although the state transition matrix 200 shows actual values/probabilities, these are for example purposes only.

Referring back to FIG. 1, when one or more of the DNA strands with the most copies are decoded and the state transition matrix is populated, the state transition matrix is provided to the error correction system 130. The error correction system 130 uses the probabilities in the state transition matrix when performing error correction on other DNA strands in the data storage system 100.

For example, the decoding system 125 may identify or start to decode a DNA strand with the second most number of copies. The error correction system 130 performs error corrections on the decoded DNA strands based, at least in part, on the probabilities provided in the state transition matrix.

Additionally, the decoding system 125 also refines the information in the state transition matrix using probability information that was obtained while decoding the DNA strand with the second most copies in the data storage system 100. Refining the information in the state transition matrix is similar to the processes that were used to initially populate the state transition matrix.

Figure 2B:
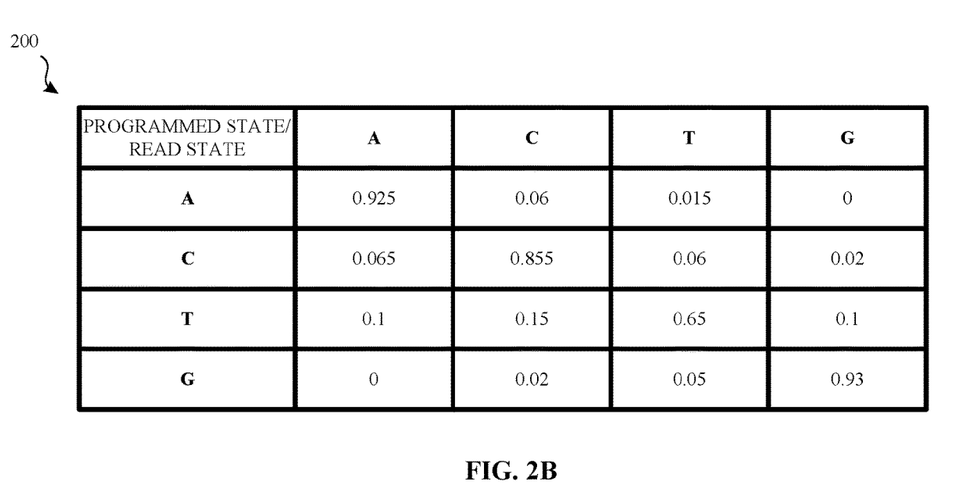
FIG. 2B illustrates the state transition matrix of FIG. 2A after it has been updated according to an example.

FIG. 2B illustrates the state transition matrix 200 of FIG. 2A after it has been updated according to an example. In an example, the probabilities in the state transition matrix 200 shown in FIG. 2B may be based, at least in part, on information that was obtained when the DNA strand with the second most number of copies (or another DNA strand with any number of copies) is decoded by a decoding system.

For example and as shown in FIG. 2B, the state transition matrix 200 shows that when the nucleotide base "A" is initially programmed, there is 92.5% probability that "A" will be read, a 6% probability that "C" will be read, a 1.5% probability that "T" will be read and a 0% probability that "G" will be read. Likewise, when the nucleotide base "C" is initially programmed, there is 6.5% probability that "A" will be read, an 85.5% probability that "C" will be read, a 6% probability that "T" will be read and a 2% probability that "G" will be read. The probabilities for the nucleotide bases "T" and "G" have also been updated.

In an example, the state transition matrix 200 may be updated or refined each time a new DNA strand, and its associated copies, are decoded. In an example, as the number of copies increases, the error correction capabilities of the error correction system (e.g., the error correction system 130) increases and decode latency decreases. In turn, this increases the efficiency and reliability of the data storage system (e.g., the data storage system 100).

Referring back to FIG. 1, the data storage system 100 may also include a dense storage management system 140. In an example, the dense storage management system 140 controls the various operations and/or processes that are carried out by and/or on the dense storage system 135. The operations and/or processes may include the mechanics of storage and retrieval of the DNA data and/or information storage management (e.g., making copies of data, deleting data, selecting subsets of the data, etc.).

The data storage system 100 may also include a control system 145. The control system 145 may include one or more processors, one or more controllers and/or other such control circuitry. In an example in which multiple processors or controllers are included, each processor or controller may be responsible for controlling different processes described herein. For example, a first processor or controller may control the generation of the state transition matrix and/or updating the state transition matrix while another processor or controller may control the decoding and/or error correction operations. The control system 145 may include circuitry for executing instructions from the computing device 150 (or from another source) and/or providing instructions to the various subsystems of the data storage system 100.

Figure 3:
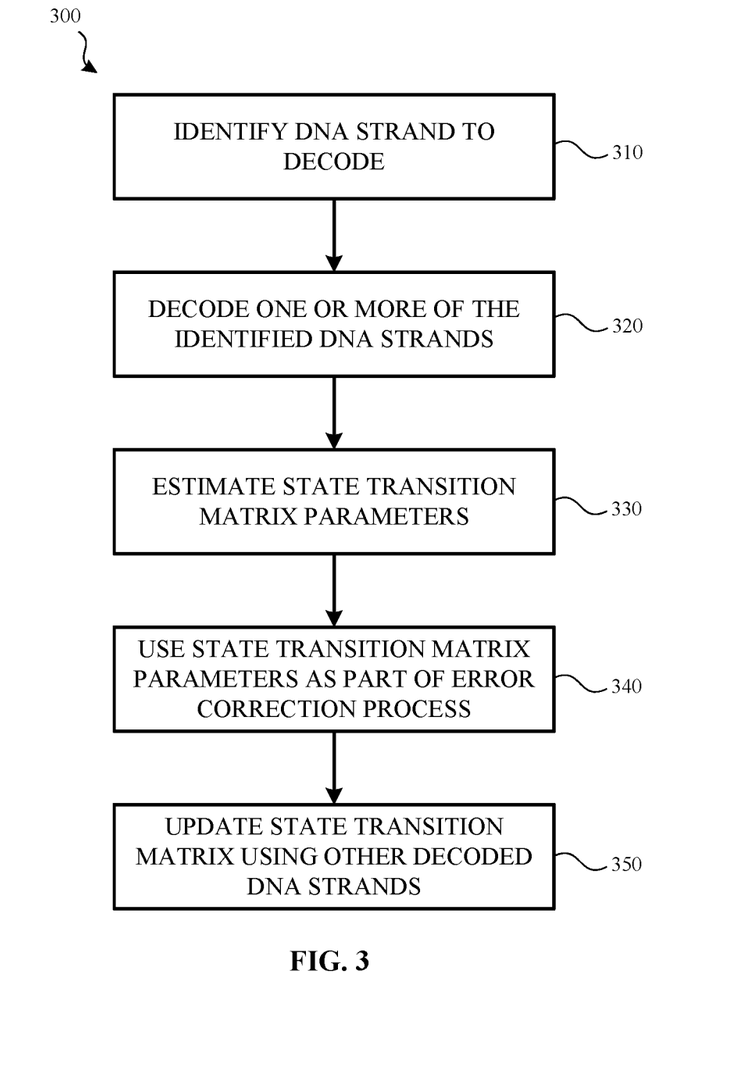
FIG. 3 illustrates a method for generating a state transition matrix according to an example.

FIG. 3 illustrates a method 300 for generating a state transition matrix according to an example. In an example, the method 300 may be used to generate the state transition matrix 200 shown and described with respect to FIG. 2A. In an example, one or more of the operations may also be used to update the state transition matrix 200 as was shown and described with respect to FIG. 2B. Additionally, the method 300 may be performed by one or more systems of a data storage device, such as, for example, the data storage device 100 shown and described with respect to FIG. 1.

Method 300 begins when a DNA strand to decode is identified (310). In an example, the DNA strand that is identified is a DNA strand that has the greatest number of copies in the data storage device when compared with other DNA strands in the data storage device. However, in examples, in which the method 300 is used to update an already generated state transition matrix, the DNA strand with the second most number of copies (or another amount of copies) is identified.

As previously explained, multiple copies of a DNA strand may be created or generated during a synthesis process and/or a sequencing process. However, the process for generating copies may not be accurate and/or precise. For example, a PCR process that is used to create copies of the DNA strands may create a first number of copies of a first DNA strand and a second number of copies of a second DNA strand. However, each copy of each DNA strand may be associated with an identifier. As such, when it is time to determine which DNA strand has the most copies (or to identify copies of an identified DNA strand), a decoding system and/or an error correction system of the data storage system may use the identifiers to determine which DNA strand has the most copies.

When the DNA strand is identified, the decoding system decodes (420) one or more of the copies the DNA strand. In an example, as part of the decoding process, the error correction system corrects any errors that are found during the decoding process.

The decoding system and/or the error correction system also compares the data that was originally written to the identified DNA strand with the decoded data to estimate (430) parameters for a state transition matrix. For example, the decoding system may determine that the identified DNA strand initially included M "A" nucleotide bases. However, during the decoding process, the decoding system determines that of the M "A" nucleotide bases, W were read as "A", X were read as "C", Y were read as "T" and Z were read as "G". As previously explained, this information is used to determine the probability that the programmed state of the nucleotide base will be the same or different as the read state. In an example, this process repeats for each of the other nucleotide bases in the identified DNA strand.

When the parameters of the state transition matrix have been determined and a state transition matrix is generated, the parameters of the state transition matrix are used (440) as part of a decoding process and/or an error correction process for another identified DNA strand. In an example, the DNA strand that is identified is a DNA strand having the second most number of copies in the DNA storage device. Although the DNA strand having the second most number of copies in the DNA storage device is specifically mentioned, other DNA strands with fewer copies may be identified.

When the second identified DNA strand is decoded and/or has undergone the error correction process using the state transition matrix, the state transition matrix is updated (450) using probability information associated with the DNA strand having the second most number of copies. In an example the probability information associated with the DNA strand having the second most number of copies is obtained or determined using similar operations that were discussed above when determining the probability information associated with the DNA strand having the most number of copies in the data storage device. One or more of the operations of the method 300 may be repeated for other DNA strands in the data storage device.

Figure 4:
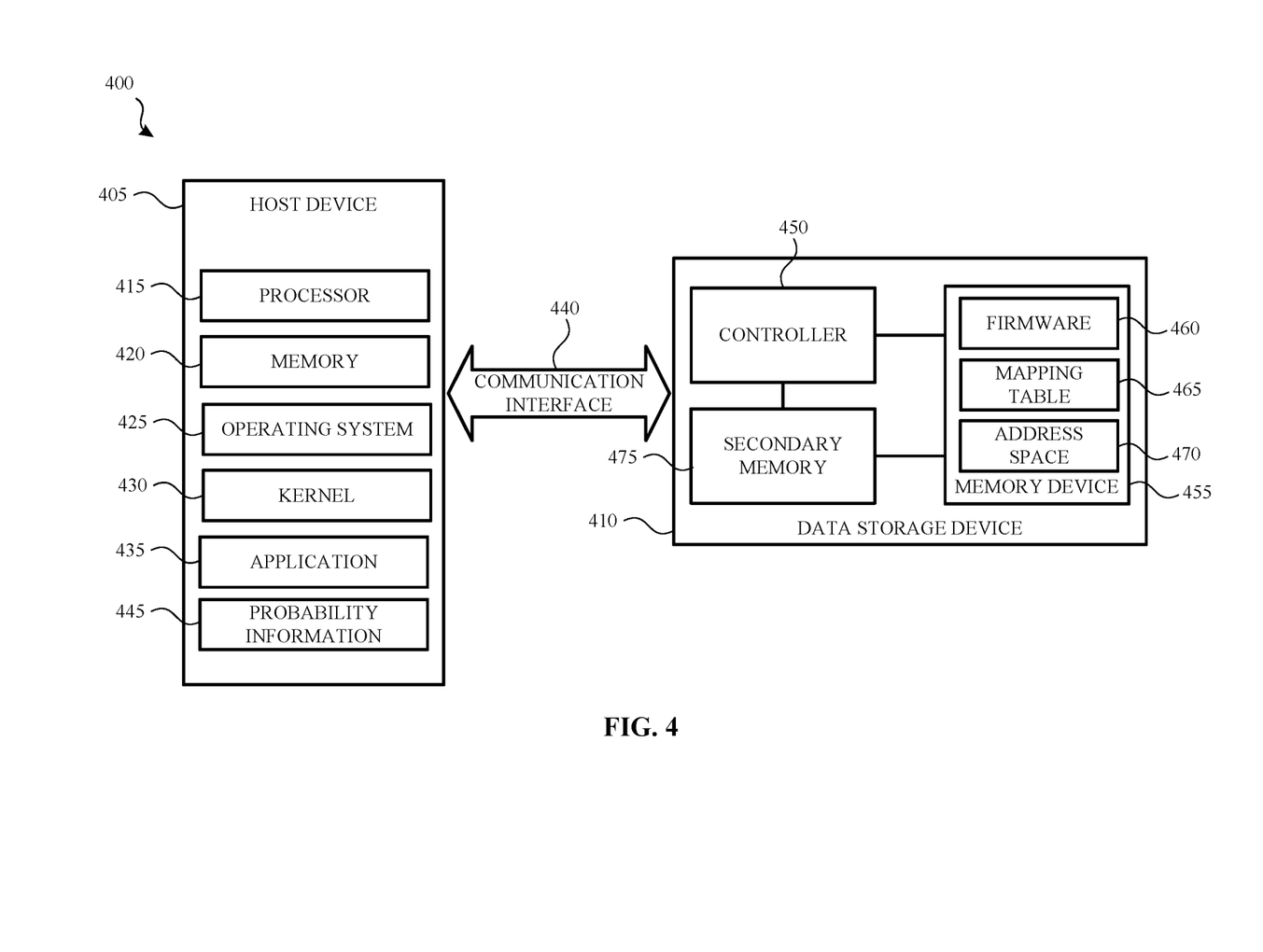
FIG. 4 is a block diagram of a system that includes a host device and a data storage device according to an example.

FIG. 4 is a block diagram of a system 400 that includes a host device 405 and a data storage device 410 according to an example. In an example, the host device 405 may be similar to the computing device 150 shown and described with respect to FIG. 1, and may be used to perform any or all of the operations described herein. The host device 405 includes at least one processor 415 and a memory device 420 (e.g., main memory). The memory device 420 may include an operating system 425, a kernel 430 and/or an application 435.

The processor 415 can execute various instructions, such as, for example, instructions from the operating system 425 and/or the application 435. The processor 415 may include circuitry such as a microcontroller, a Digital Signal Processor (DSP), an Application-Specific Integrated Circuit (ASIC), a Field Programmable Gate Array (FPGA), hard-wired logic, analog circuitry and/or various combinations thereof. In an example, the processor 415 includes a System on a Chip (SoC).

In an example, the memory device 420 is used by the host device 405 to store data used by the processor 415. Data stored in the memory device 420 includes instructions provided by the data storage device 410 via a communication interface 440. The data stored in the memory device 420 may also include data used to execute instructions from the operating system 425 and/or one or more applications 435. The memory device 420 may also store and/or determine probability information 445 that is used to generate and/or update a state transition matrix. In an example, the memory 420 is volatile memory, such as, for example, Dynamic Random Access Memory (DRAM).

In an example, the operating system 425 may create a virtual address space for the application 435 and/or other processes executed by the processor 415. The virtual address space may map to locations in the memory device 420. The operating system 425 may include or otherwise be associated with a kernel 430. The kernel 430 may include instructions for managing various resources of the host device 405 (e.g., memory allocation), handling read and write requests and so on.

The communication interface 440 communicatively couples the host device 405 and the data storage device 410. The communication interface 440 may be a Serial Advanced Technology Attachment (SATA), a PCI express (PCIe) bus, a Small Computer System Interface (SCSI), a Serial Attached SCSI (SAS), Ethernet, Fibre Channel, or WiFi. As such, the host device 405 and the data storage device 410 need not be physically co-located and may communicate over a network such as a Local Area Network (LAN) or a Wide Area Network (WAN), such as the internet. In addition, the host device 405 may interface with the data storage device 410 using a logical interface specification such as Non-Volatile Memory express (NVMe) or Advanced Host Controller Interface (AHCI).

The data storage device 410 includes a controller 450 and a memory device 455 (e.g. volatile and/or non-volatile memory). The memory device 455 (and/or portions of the memory device 455) may also be referred to as a storage medium. The memory device 455 includes a number of storage elements. In an example, each storage element is a chip or a memory die that is used to store data.

For example, the memory device 455 may include a first memory die and a second memory die. In an example, the first memory die and the second memory die include non-volatile memory elements such as, for example, NAND flash memory elements and/or NOR flash memory elements. Although two memory dies are mentioned, the memory device 455 may include any number of storage elements. For example, the storage elements may take the form of solid-state memory such as, for example, 2D NAND, 3D NAND memory, multi-level cell memory, triple level cell memory, quad-level cell memory, penta-level cell memory or any combination thereof.

The controller 450 may include circuitry for executing instructions. The instructions may originate from firmware 460 associated with the data storage device 410. In another example, the instructions may originate from the host device 405. Accordingly, the controller 450 may include circuitry such as one or more processors, a microcontroller, a DSP, an ASIC, an FPGA, hard-wired logic, analog circuitry and/or a combination thereof. In another example, the controller 450 may include a SoC.

The data storage device 410 may also include secondary memory 475. The secondary memory 475 may be a rotating magnetic disk or non-volatile solid-state memory, such as flash memory. While the description herein refers to solid-state memory generally, it is understood that solid-state memory may comprise one or more of various types of memory devices such as flash integrated circuits, NAND memory (e.g., single-level cell (SLC) memory, multi-level cell (MLC) memory (i.e., two or more levels), or any combination thereof), NOR memory, EEPROM, other discrete Non-Volatile Memory (NVM) chips, or any combination thereof.

In some examples, the memory device 455 is capable of storing data at a byte-addressable level, as opposed to other types of non-volatile memory that have a smallest writable data size such as a page size of 4 KB or a sector size of 512 Bytes.

In some examples, the memory device 455 may also store a mapping table 465 and/or an address space 470. In some examples, the controller 450 can associate portions of data stored in the secondary memory 475 with unique identifiers. The unique identifiers may be stored in the memory device 455 and be used by the operating system 425 to access stored data. For example, the mapping table 465 can provide a mapping of unique identifiers with indications of physical locations (e.g., Physical Block Addresses (PBAs)) where the corresponding portions of data are stored in the memory device 455 and/or the secondary memory 475.

In some examples, the firmware 460 may store, maintain, be associated with or otherwise have access to a mapping table (e.g., mapping table 465) that stores and/or maintains mapping information for the various DNA sequences such as described above.

As briefly discussed above, the memory device 455 may also include address space 470. The address space 470 can serve as at least a portion of an address space used by the processor 415. In an example, the address space 470 can store data at a byte-addressable level that can be accessed by the processor 415 (e.g., via the communication interface 440).

For example, the data storage device 410 may provide the host device 405 with an indication of the address space 470. The host device 405 may then associate an address range for the address space 470 and an indication that this address range is to be used as a byte-addressable address space, such as for a page cache.

In another example, the host device 405 may manage the data storage device 410 such that the processor 415 can directly access address space 470. For example, the data storage device 410 may provide logical to physical address translation information to the host device 405, which can be called by the host device 405 and executed by the processor 415 and/or the controller 450. In some examples, the controller 450 may include or otherwise be associated with a flash translation layer (FTL). The FTL may map the logical block addresses to the physical addresses of the memory device 455.

Although FIG. 4 illustrates the host device 405 being separate from the data storage device 410, the host device 405 and the data storage device 410, as well the various components described, may be part of a single device or part of multiple devices.

The term computer-readable media as used herein may include computer storage media. Computer storage media may include volatile and nonvolatile, removable and non-removable media implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by a computing device. Any such computer storage media may be part of the computing device. Computer storage media does not include a carrier wave or other propagated or modulated data signal.

Additionally, examples described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various examples.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Based on the above, examples of the present disclosure describe a data storage system, comprising: a control system operable to: identify a storage material having a greatest number of copies when compared with other storage materials in the data storage system; decode at least one copy of the storage material; and generate a state transition matrix based, at least in part, on the decoded at least one copy of the storage material having the greatest number of copies. In an example, the data storage system also includes an error correction system, wherein the error correction system is operable to utilize the state transition matrix when decoding the other storage materials in the data storage system. In an example, the control system is further operable to: identify a storage material having a second greatest number of copies when compared with the other storage materials in the data storage system; decode at least one copy of the storage material having the second greatest number of copies; and update the state transition matrix based, at least in part, on the decoded at least one copy of the storage material having the second greatest number of copies. In an example, the data storage system also includes an error correction system, wherein the error correction system is operable to utilize the updated state transition matrix when decoding the other storage materials in the data storage system. In an example, the state transition matrix includes a probability that a first symbol of the storage material that was programmed in a first state, will be read in the first state, a second state, a third state and a fourth state. In an example, the state transition matrix includes a probability that a second symbol of the storage material that was programmed in a second state will be read in the first state, the second state, the third state and the fourth state. In an example, the control system is further operable to identify the storage material having the greatest number of copies during a sequencing process. In an example, the control system is further operable to identify the storage material having the greatest number of copies during a synthesis process.

Examples also describe a method, comprising: identifying a storage material having a greatest number of copies in a data storage system; decoding at least one copy of the storage material; and generating a state transition matrix based, at least in part, on the decoded at least one copy of the storage material. In an example, the method also includes utilizing the state transition matrix when decoding other storage materials in the data storage system. In an example, the method also includes identifying a storage material having a second greatest number of copies in the data storage system; decoding at least one copy of the storage material having the second greatest number of copies; and updating the state transition matrix based, at least in part, on the decoded at least one copy of the storage material having the second greatest number of copies. In an example, the method also includes utilizing the updated state transition matrix when decoding the other storage materials in the data storage system. In an example, the state transition matrix includes a probability that a first storage material symbol that was programmed in a first state, will be read in the first state, a second state, a third state and a fourth state. In an example, the state transition matrix includes a probability that a second storage material symbol that was programmed in a second state will be read in the first state, the second state, the third state and the fourth state. In an example, the method also includes identifying the storage material having the greatest number of copies during a sequencing process. In an example, the method also includes identifying the storage material having the greatest number of copies during a synthesis process.

Additional examples describe a data storage system, comprising: means for identifying a storage material having a greatest number of copies; means for decoding at least one copy of the storage material; and means for generating a state transition matrix based, at least in part, on the decoded at least one copy of the storage material having the greatest number of copies. In an example, the data storage system also includes means for utilizing the state transition matrix when decoding the other storage materials in the data storage system. In an example, the data storage system also includes means for identifying a storage material having the second greatest number of copies; means for decoding at least one copy of the storage material having the second greatest number of copies; and means for updating the state transition matrix based, at least in part, on the decoded at least one copy of the storage material having the second greatest number of copies. In an example, the data storage system also includes means for utilizing the updated state transition matrix when decoding the other storage materials in the data storage system.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an example with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/or schematic block diagrams of methods, apparatuses, systems, and computer program products according to examples of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute by way of the processor or other programmable data processing apparatus, create means for implementing the functions and/or acts specified in the schematic flowchart diagrams and/or schematic block diagrams block or blocks.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A-B, A-C, B-C, and A-B-C, as well as multiples of the same members. Likewise, "at least one of: A, B, and C" is intended to cover A, B, C, A-B, A-C, B-C, and A-B-C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A data storage system, comprising:
a control system operable to:
identify a storage material having a greatest number of copies when compared with other storage materials in the data storage system;
decode at least one copy of the storage material having the greatest number of copies; and
generate a state transition matrix based, at least in part, on the decoded at least one copy of the storage material having the greatest number of copies.

2. The data storage system of claim 1, further comprising an error correction system, wherein the error correction system is operable to utilize the state transition matrix when decoding the other storage materials in the data storage system.

3. The data storage system of claim 1, wherein the control system is further operable to:
identify a storage material having a second greatest number of copies when compared with the other storage materials in the data storage system;
decode at least one copy of the storage material having the second greatest number of copies; and
update the state transition matrix based, at least in part, on the decoded at least one copy of the storage material having the second greatest number of copies.

4. The data storage system of claim 3, further comprising an error correction system, wherein the error correction system is operable to utilize the updated state transition matrix when decoding the other storage materials in the data storage system.

5. The data storage system of claim 1, wherein the state transition matrix includes a probability that a first symbol of the storage material, which was programmed in a first state, will be read in the first state, a second state, a third state, and a fourth state.

6. The data storage system of claim 5, wherein the state transition matrix further includes a probability that a second symbol of the storage material, which was programmed in a second state, will be read in the first state, the second state, the third state, and the fourth state.

7. The data storage system of claim 1, wherein the control system is further operable to identify a storage material having a greatest number of copies during a sequencing process.

8. The data storage system of claim 1, wherein the control system is further operable to identify a storage material having a greatest number of copies during a synthesis process.

9. A method, comprising:
identifying a storage material having a greatest number of copies in a data storage system;
decoding at least one copy of the storage material having the greatest number of copies; and
generating a state transition matrix based, at least in part, on the decoded at least one copy of the storage material having the greatest number of copies.

10. The method of claim 9, further comprising utilizing the state transition matrix when decoding other storage materials in the data storage system.

11. The method of claim 9, further comprising:
identifying a storage material having a second greatest number of copies in the data storage system;
decoding at least one copy of the storage material having the second greatest number of copies; and
updating the state transition matrix based, at least in part, on the decoded at least one copy of the storage material having the second greatest number of copies.

12. The method of claim 11, further comprising utilizing the updated state transition matrix when decoding other storage materials in the data storage system.

13. The method of claim 9, wherein the state transition matrix includes a probability that a first storage material symbol, which was programmed in a first state, will be read in the first state, a second state, a third state, and a fourth state.

14. The method of claim 13, wherein the state transition matrix further includes a probability that a second storage material symbol, which was programmed in a second state, will be read in the first state, the second state, the third state, and the fourth state.

15. The method of claim 9, further comprising identifying a storage material having a greatest number of copies during a sequencing process.

16. The method of claim 9, further comprising identifying a storage material having a greatest number of copies during a synthesis process.

17. A data storage system, comprising:
 means for identifying a storage material having a greatest number of copies;
 means for decoding at least one copy of the storage material having the greatest number of copies; and
 means for generating a state transition matrix based, at least in part, on the decoded at least one copy of the storage material having the greatest number of copies.

18. The data storage system of claim 17, further comprising means for utilizing the state transition matrix when decoding other storage materials in the data storage system.

19. The data storage system of claim 17, further comprising:
 means for identifying a storage material having a second greatest number of copies;
 means for decoding at least one copy of the storage material having the second greatest number of copies; and
 means for updating the state transition matrix based, at least in part, on the decoded at least one copy of the storage material having the second greatest number of copies.

20. The data storage system of claim 19, further comprising means for utilizing the updated state transition matrix when decoding other storage materials in the data storage system.

* * * * *